US00RE36908E

United States Patent [19]

Ling

[11] E Patent Number: Re. 36,908

[45] Reissued Date of Patent: Oct. 10, 2000

[54] CEILING MOUNTED WALLWASH LIGHT FIXTURE

[75] Inventor: Geoffrey Ling, North Barrington, Ill.

[73] Assignee: Cooper Industries, Inc., Houston, Tex.

[21] Appl. No.: 09/111,867

[22] Filed: Jul. 8, 1998

Related U.S. Patent Documents

Reissue of:

[64] Patent No.: 5,535,110
Issued: Jul. 9, 1996
Appl. No.: 08/389,403
Filed: Feb. 16, 1995

[51] Int. Cl.[7] ..... F21V 7/00

[52] U.S. Cl. ..... 362/297; 362/148; 362/346; 362/348; 362/350

[58] Field of Search ..... 362/297, 147, 362/148, 346, 347, 348, 349, 304, 350

[56] References Cited

U.S. PATENT DOCUMENTS

| | | | |
|---|---|---|---|
| 1,350,295 | 8/1920 | Champeau | 362/364 |
| 1,821,733 | 9/1931 | Thibodeau | 362/349 |
| 2,887,568 | 5/1959 | Franck | 362/147 |
| 3,040,172 | 6/1962 | Chan . | |
| 4,190,355 | 2/1980 | Avery et al. | 362/297 |
| 4,475,147 | 10/1984 | Kristofek | 362/148 |
| 4,519,019 | 5/1985 | Hall | 362/147 |
| 4,545,000 | 10/1985 | Franley et al. | 362/346 |
| 4,564,888 | 1/1986 | Lewin et al. | 362/147 |
| 4,569,003 | 2/1986 | Elmer et al. | 362/147 |
| 4,742,440 | 5/1988 | Guzzini | 362/346 |
| 4,754,377 | 6/1988 | Wenman | 362/148 |
| 4,796,169 | 1/1989 | Shemitz | 362/282 |
| 5,034,867 | 7/1991 | Mayer | 362/348 |
| 5,075,828 | 12/1991 | Gordin et al. | 362/346 |
| 5,130,913 | 7/1992 | David | 362/297 |

*Primary Examiner*—Laura K. Tso
*Attorney, Agent, or Firm*—Fish & Richardson P.C.

[57] ABSTRACT

A ceiling mounted, recessed, wallwash light fixture includes a reflector having an internal reflecting surface. A wallwash segment of that reflecting surface is defined by vertically adjacent reflecting faces each arranged so that an effective lowest point of brightness seen by the reflecting face is reflected along a line passing below an opposing portion of a bottom edge of the reflector. The wallwash segment can be defined by an insert attached to the reflecting surface.

22 Claims, 3 Drawing Sheets

19
10
D'
D
20
22
39
12
C'
C
16
14
37
14A
32A
C
37'
L
14B
18
39'

48
50

27
30
28
12
29
25
29
22

37
12
30
32
32
32A
34
37'

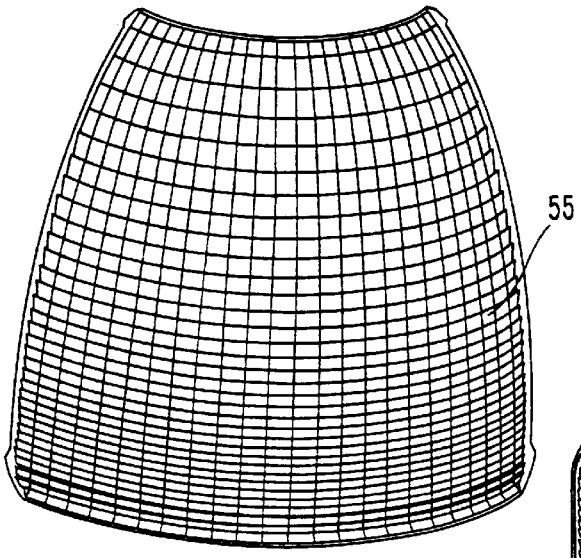
FIG. 9
FIG. 10
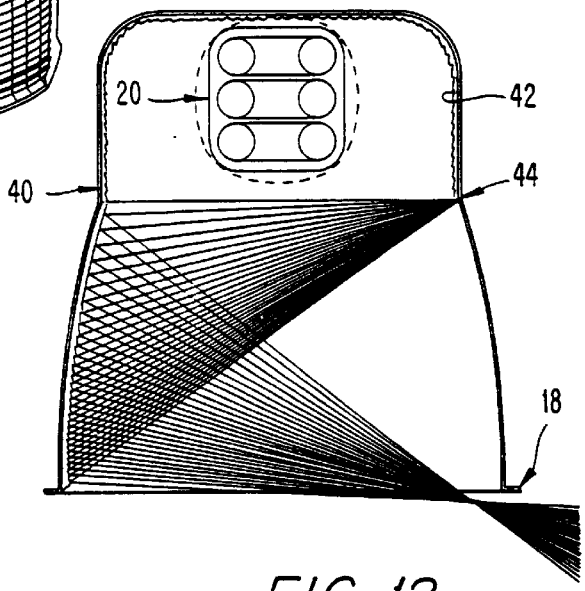
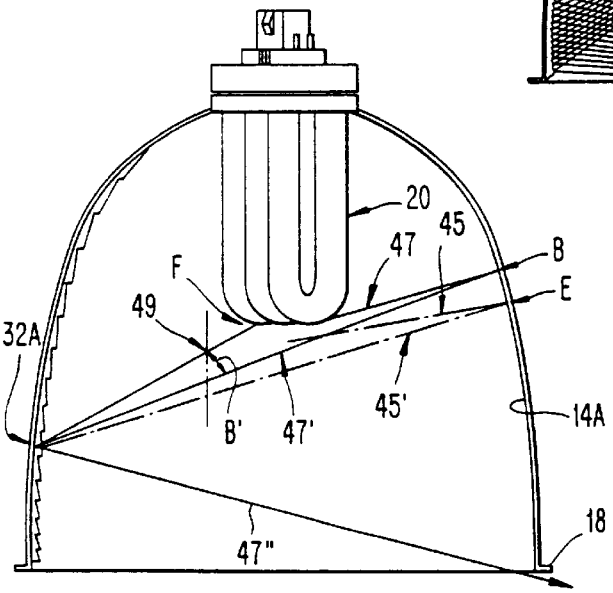
FIG. 11
FIG. 12
(PRIOR ART)
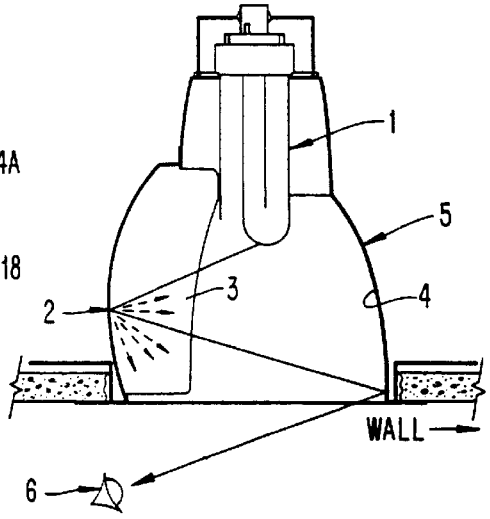

CEILING MOUNTED WALLWASH LIGHT FIXTURE

Matter enclosed in heavy brackets [ ] appears in the original patent but forms no part of this reissue specification; matter printed in italics indicates the additions made by reissue.

BACKGROUND OF THE INVENTION

The present invention relates to recessed, ceiling-mounted wallwash light fixtures.

It is conventional to illuminate a vertical wall of a room by recess-mounting a wallwash light fixture in the ceiling at a predetermined distance from the wall. The fixture includes a reflector having an internal reflecting surface, a segment of which being oriented to reflect light toward the wall. That segment can comprise an external secondary reflector element mounted on the outside of the main reflector after a window has been cut therein (e.g., see U.S. Pat. No. 4,742,440). Alternatively, the secondary reflector element can be mounted on the inside of the main reflector (e.g., see U.S. Pat. No. 4,475,147). A shortcoming of conventional wallwash fixtures is that light is reflected off the secondary reflector element in a somewhat imprecise manner, whereby the wall is not uniformly illuminated, and/or stray light reflected from the secondary reflector element contacts an opposite side of the fixture interior. For example, as depicted in FIG. 12, a main reflector 5 has a hole cut therein, and a wallwash attachment 3 is applied across the outside of the hole light from a point of brightness on a lamp 1 reflects off a reflection point 2 of a secondary wallwash reflector 3 and then off an opposite side 4 of the main reflector 5 from which it is seen from below by a viewer 6. Such stray light causes unsightly brightness to the viewer 6.

It would, therefore, be desirable to provide a wallwash light fixture of the recessed, ceiling-mount type having a secondary reflector segment which reflects light in a highly precise manner toward the wall to be illuminated.

SUMMARY OF THE INVENTION

The present invention relates to a recessed, ceiling-mount wallwash light fixture for use with a lamp, comprising a reflector body which includes an internal reflector surface forming a cavity. The reflector body has a lower edge defining a bottom opening of the cavity. The reflector surface includes a wallwash segment extending around less than the entire inside perimeter of the reflector surface. The wallwash segment is vertically stepped to form a plurality of vertically adjacent reflecting faces which are oriented at respective inclinations with respect to horizontal for reflecting light below an opposite portion of the edge.

The reflecting faces are preferably formed on an insert which is attached to the reflector body. The insert may comprise a stiff plate, or a film.

The present invention also relates to the configuration of the insert per se.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 9 is a perspective view of an alternative insert according to the invention having a pattern of rectangular facets;

FIG. 10 is a view similar to FIG. 1 of an alternative form of reflector in which the present invention is disposed;

FIG. 11 is a view similar to FIG. 1 of another form of reflector in which the present invention is disposed; and FIG. 12 is a vertical sectional view of a prior art wallwash reflector.

DETAILED DESCRIPTION OF PREFERRED EMBODIMENTS OF THE INVENTION

Figure 1:
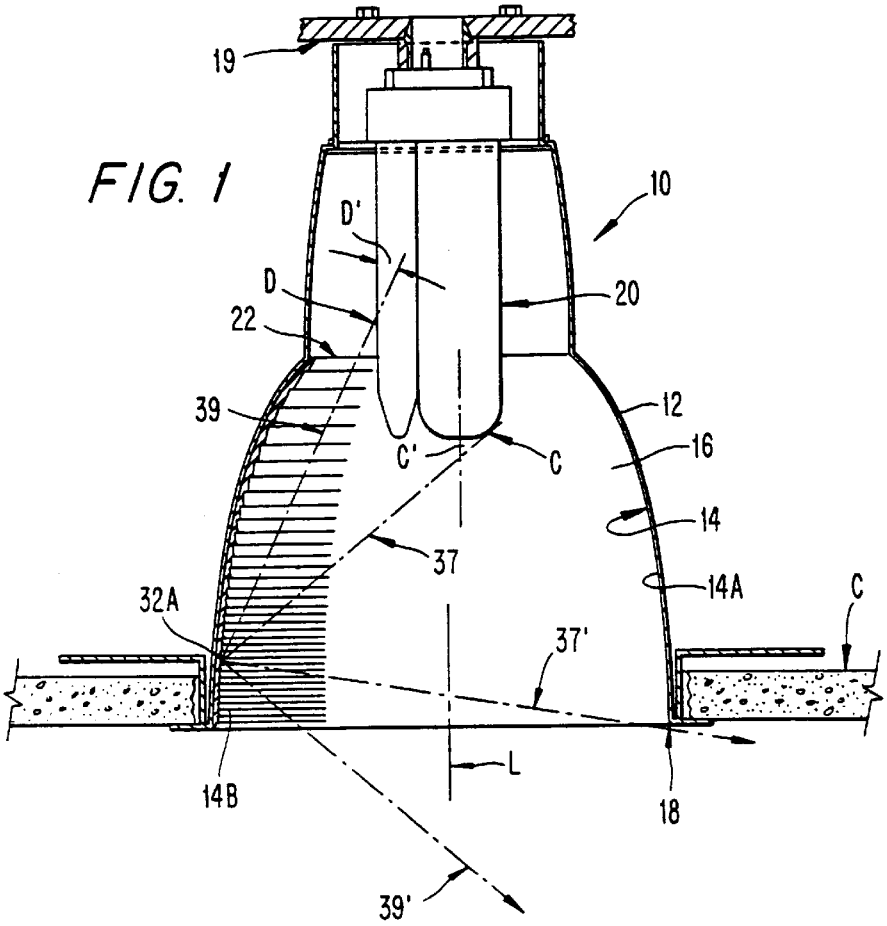
FIG. 1 is a vertical sectional view taken through a reflector which is recess-mounted in a ceiling, and which possesses a wallwash reflecting structure according to the present invention.

A recessed, ceiling mounts wallwash light fixture 10 depicted in the drawings includes a reflector body 12 adapted to be recess-mounted in a ceiling C. The manner of mounting the reflector in a conventional recessed fixture housing 19 is well known to those skilled in the art and need not be described in detail. The reflector body includes an internal specular surface 14 which defines a downwardly open cavity 16. A circular lower edge 18 of the reflector forms the open bottom of the cavity and defines a vertical longitudinal axis L of the cavity. The cross-sectional area of the cavity becomes progressively smaller in an upward direction.

Situated at an upper end of the cavity is a lamp 20 of any suitable type, the lamp being recessed with respect to the open bottom of the cavity. The lamp 20 can be mounted to a portion of the fixture housing 19.

The internal specular surface 14 of the cavity includes a first segment 14A which is continuously smooth, and a second segment 14B which defines a wallwash reflector segment. That wallwash reflector segment has a vertically stepped profile, defining a plurality of vertically adjacent reflecting faces designed in accordance with its position in relation to the lamp and the bottom opening of the reflector body, as will be explained below. The reflector is in the form of a downlight/wallwasher, meaning that the first segment 14A is designed to reflect a significant portion of direct light from the lamp downwardly to illuminate the area located beneath the fixture.

Figure 2:
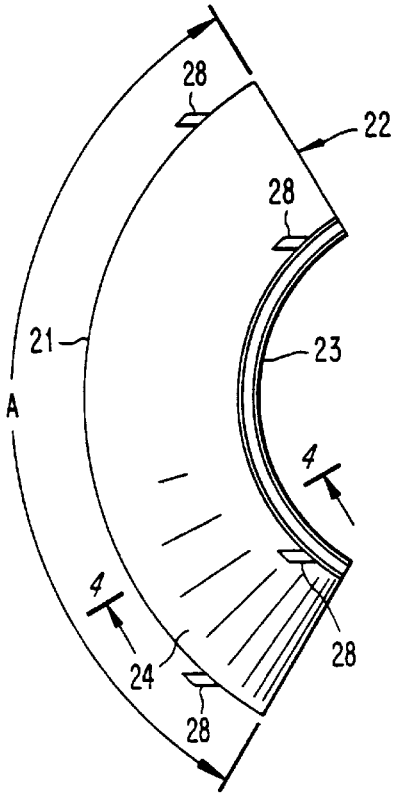
FIG. 2 is a top plan view of a wallwash insert shown in FIG. 1.
Figure 3:
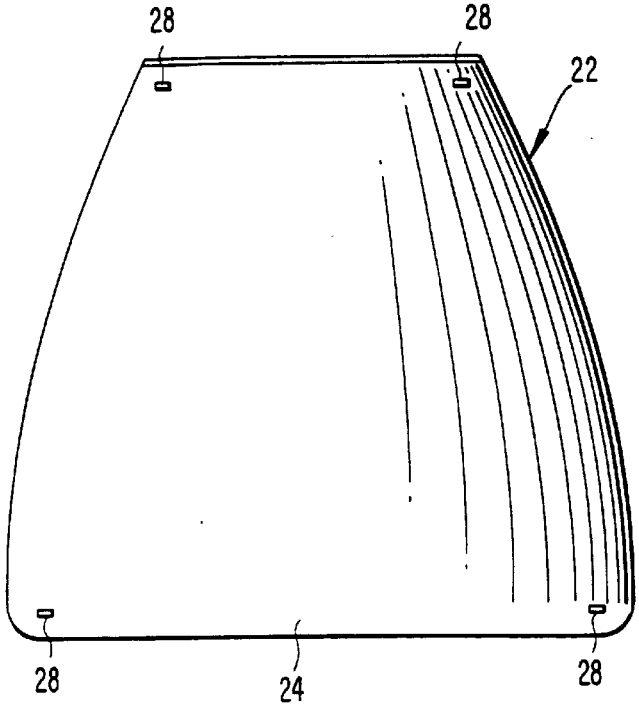
FIG. 3 is a side elevational view of the insert depicted in FIG. 2.
Figure 4:
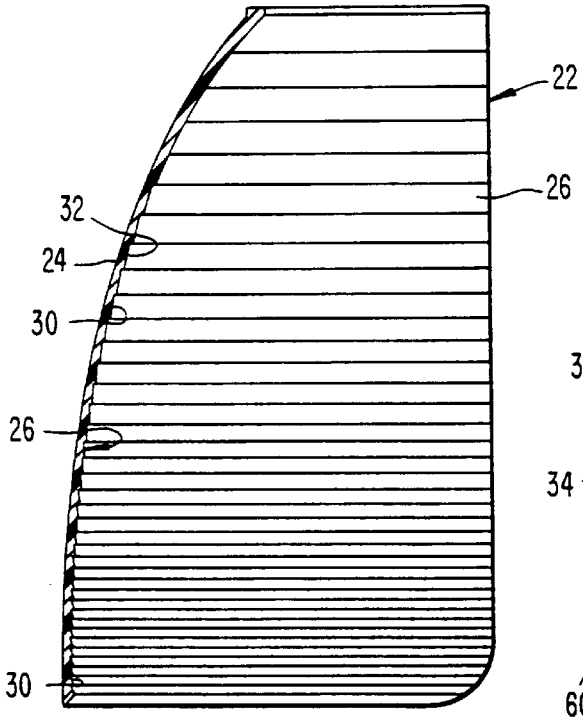
FIG. 4 is a sectional view taken along the line 4—4 in FIG. 2.
Figure 5:
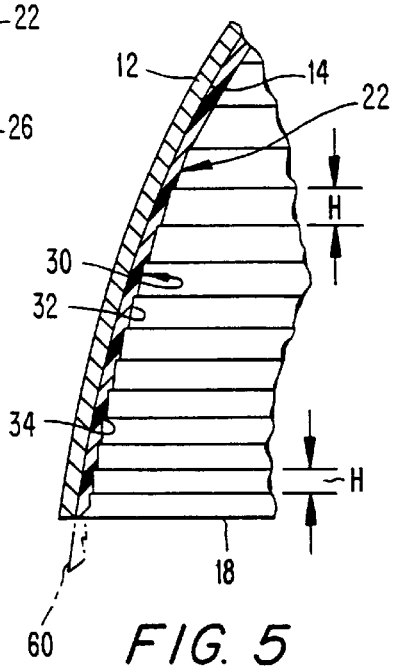
FIG. 5 is an enlargement of a portion of the insert depicted in FIG. 4.

In a first embodiment of the invention (see FIGS. 2–5), the wallwash segment 14B is formed as part of an insert 22 which is mounted to the body 12 within the cavity 16. The insert 22 extends about one-third of the perimeter of the surface 14, i.e., above one-third of the circumference of the surface in the case of a cavity having a circular cross section. Preferably, the insert extends for an angle A of about 120 degrees *from one upright side edge of the reflector segment to the opposite upright side edge thereof.* A lower edge 21 of the insert has a greater radius than an upper edge 23 thereof as is evident from FIG. 2. As shown most clearly in FIGS. 4 and 5, the insert 22 comprises a curved plate having a smooth outer surface 24, and a stepped inner surface 26.

Figure 6:
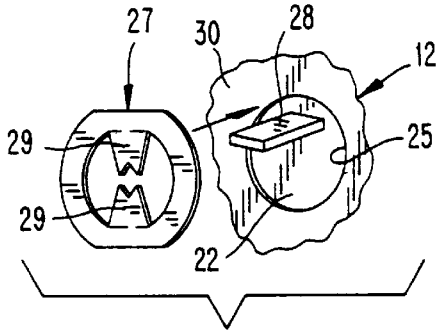
FIG. 6 is a fragmentary perspective view depicting the manner of mounting a wallwash reflector insert in the reflector.

The outer surface 24 is configured with the same curvature as the body 12 so that the insert 22 lies flush thereagainst. Most preferably, the insert 22 is attached by an adhesive. However, any suitable type of mechanical connection could be used. For example, as shown in FIG. 6, a plurality of bosses 28 project from the outer surface 24 and are adapted to pass through respective holes 25 formed in the body 12 and then become secured by conventional clips 27 to the body 12. The clips slide onto the bosses 28 so that flexible teeth 29 of the clips grip the bosses. Other ways of mounting the insert will be apparent to those skilled in the art. For example, the bosses could form a snap-in connector with the holes, or could comprise bendable tabs.

The inner surface 26 of the insert 22 includes steps 30 disposed one above the other, i.e., in vertically or longitudinally adjacent relationship (with reference to the longitudinal axis L). Each step extends circumferentially with reference to the axis L and includes a generally horizontal step-defining face 34 interconnecting a top edge of one reflecting face with a bottom edge of the generally upright or vertical reflecting face 32 disposed thereabove. The faces 34 need not be horizontal, but could be inclined relative to horizontal.

The reflecting faces 32 are oriented at respective inclinations with respect to a vertical plane for reflecting light below an opposite portion of the edge 18. Preferably, the inclination of each reflecting face is such that the effective lowest point of brightness "seen" by that face is reflected along a line passing below a portion of the edge 18 disposed opposite face. A point of brightness can be defined in different ways, but every reflecting face should be designed in accordance with the selected definition.

For example, the points of brightness could be defined firstly as being only points on the lamp 20 itself. That is, with attention directed to FIG. 1, if two points C and D on the lamp are considered with reference to a reflecting face 32 having a reflecting point 32A, it can be seen that reference or incidence lines 37 and 39 can be drawn from the points C, D, respectively, to the reflecting point 32A. The line 37 forms an angle C' with a vertical plane, whereas the line 39 forms a smaller angle D' with vertical. The effective lowest point of brightness would be defined in this case as the point whose line of incidence forms the largest angle relative to vertical, namely point C. By orienting the reflecting face on which point 32A is disposed so that the light represented by line 37 is reflected off point 32A in a direction 37' passing below the opposite portion of the edge 18, it is ensured that light from all points of brightness disposed above point C and reflecting off point 32A (and its associated reflecting face) will also pass below the edge 18, rather than reflecting off the downlight surface segment 14A located above the edge 18. Consequently, the brightness of the surface segment 14A when viewed from below will be minimized.

Alternatively, it might be desired to define a point of brightness in a second manner to include not only points on the lamp, but also points on the reflector which appear bright or "flashed" in that they have similar luminance to the lamp itself. For example, with reference to FIG. 11, light traveling from the lamp 20 to a point B on the specular reflector along line 47 is reflected to the reflecting point 32A along line 47' which forms an angle B' with vertical. All other lines from point 32A to the reflector forming a larger angle with vertical will not pass through the lamp, e.g., see broken line 45, 45' which reflects off point E. Hence, the light on point B is "flashed" with respect to point 32A, whereas light on point E is not "flashed" with respect to point 32A. Note also, that light traveling to point 32A directly from point F on the lamp 20 along line 49 forms a smaller angle with vertical than the line 47'.

Accordingly, under the second definition of effective lowest point of brightness, the point B would constitute the effective lowest point of brightness with respect to the reflecting surface on which point 32A is disposed. Therefore, by orienting that reflecting surface so that light from point B is reflected below the opposite portion of edge 18 (i.e., so that the line 47" passes below the edge 18), it is ensured that light from all points of brightness (as defined under the second definition) disposed above the point B will also pass below that edge, rather than reflecting off the down light surface segment 14A located above the edge 18. As a result, the brightness of the surface segment 14A when viewed from below will be minimized as pointed out earlier.

The effective lowest point of brightness in connection with a type of reflector 40 having a diffuse type of reflecting surface 42, such as depicted in FIG. 10, could be defined by the lowest point 44 on that diffuse reflecting surface 42. Lines of incidence from that lowest point 44 to each reflecting face are shown in FIG. 10, and it will be appreciated that all of those lines extend below the edge 18.

As regards the reflecting surfaces 32 themselves, the uniformity of light reflected thereby can be maximized by minimizing the height of the reflecting face, especially as regards the lowest reflecting faces. Thus, at least the lowest reflecting faces, e.g., lowest ten reflecting faces, have identical, short heights H (e.g., 2 mm). The remaining reflecting faces could also have the same height H, but in order to reduce the cost of manufacture, they preferably have progressively increasing heights which increase gradually, e.g., by five percent per step.

The insert 22 can be formed of any suitable material, such as a machined or molded metal which may be polished or metallized, or metallized plastic, for example, vacuum metallized injection-molded polycarbonate with a UV resistant and scratch resistant lacquer. The reflector body 12 is preferably formed of aluminum.

The reflecting faces 32 can be of any suitable shape when viewed in cross-section. For example, as shown in the cross-sectional view of FIG. 5, the reflecting faces 32 can be straight. Alternatively, they could comprise other shapes, such as a section of an ellipse, or a section of a macrofocal ellipse for example.

Instead of comprising a stiff plate, the insert 22 could be formed of a film to which miniaturized steps have been applied. The film could be secured to the body 12 by adhesive.

Figure 7:
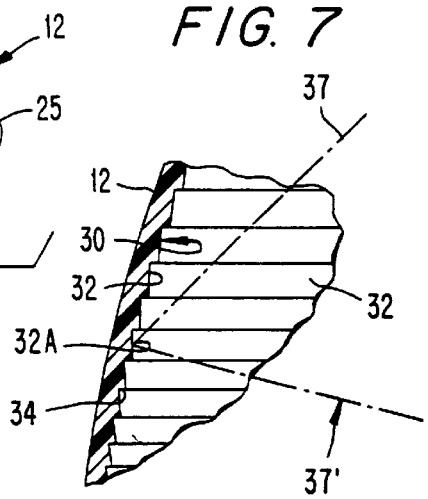
FIG. 7 is a view similar to FIG. 5 of an alternative embodiment of the present invention.

Instead of being formed as part of a film or an insert 22, the reflecting faces 32 could be of integral one piece construction with the body 12 as shown in FIG. 7, such as by being integrally molded or cast therewith, or being machined into the body 12.

Figure 8:
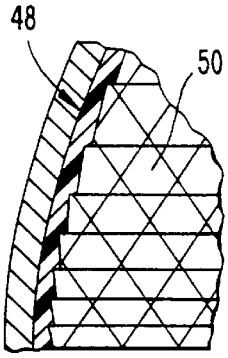
FIG. 8 is a view similar to FIG. 7 of yet another alternative embodiment of the invention.

It may be desirable to form the reflecting faces as an arrangement of facets 50 as depicted on the reflector 48 shown in FIG. 8. The facets could be of any suitable shape and are designed to reflect the light in the same manner as the aforementioned faces 32 of steps 30. For example, each facet could form a flat or curved reflecting face. An insert 55 having a rectangular facet pattern is depicted in FIG. 9.

In order to enable the very top portion of the wall to be illuminated, the insert could be configured so that a lower portion 60 thereof (see the phantom lines in FIG. 5) extends slightly below the edge 18.

It will be appreciated from the foregoing, that the present invention provides an insert for converting a reflector of standard shape into a wallwash reflector without resulting in an increase in space occupied by the reflector. The insert is easy to install and avoids excessive brightness of the reflector when viewed from below. Also, the reflector minimizes the generation of "fringes" on the wall being illuminated.

While the present invention has been disclosed in connection with an insert which affixes in a flush manner to the inside reflector surface, it is applicable to inserts attached in any manner to the reflector body, as well as to the type of insert which is attached to the outside of a reflector body across a window cut therein as depicted in FIG. 11.

The embodiments disclosed herein are of the single wallwash type. However, the invention is applicable to (a) double wallwashers wherein inserts 22 would be mounted on opposite sides of the reflector, and (b) corner wallwashers wherein two inserts 22 would be arranged side-by-side to subtend a total angle of 240°.

The reflector bodies described herein are of the type wherein the cavity has a circular cross section alternatively, the reflector body could form a cavity having a rectangular cavity (as viewed from below).

Although the present invention has been described in connection with preferred embodiments thereof, it will be appreciated by those skilled in the art that additions, deletions, modification, and substitutions not specifically described may be made without departing from the spirit and scope of the invention as defined in the appended claims.

What is claimed is:

1. A recessed, ceiling-mount wallwash light fixture for use with a lamp, comprising a reflector body including an internal reflector surface forming a cavity; said reflector body having a lower edge defining a bottom opening of said cavity; said reflector surface including a wallwash segment extending around less than the entire inside perimeter of said reflector surface, said wallwash segment forming a plurality of vertically adjacent reflecting faces oriented at respective inclinations with respect to vertical for reflecting light below an opposite portion of said edge, said wallwash segment being vertically stepped in that each reflecting face is separated from a vertically adjacent reflecting face by a circumferentially extending non-reflecting step-defining face which interconnects a top edge of a reflecting face with a bottom edge of another reflecting face disposed thereabove.

2. The fixture according to claim 1, wherein said reflecting faces located adjacent a lower edge of said reflector have smaller heights than said reflecting faces located adjacent a upper end of said reflector.

3. The fixture according to claim 1, wherein said cavity has a circular cross-section.

4. The fixture according to claim 3, wherein each reflecting face is circumferentially continuous from one edge of said segment to a circumferentially spaced opposite edge thereof.

5. The fixture according to claim 1, wherein said reflecting faces are straight as viewed in a cross-sectional plane containing said axis.

6. The fixture according to claim 1, wherein said reflecting faces are formed on an insert attached to said body.

7. The fixture according to claim 6, wherein said insert is situated inside of said body.

8. The fixture according to claim 7, wherein said insert includes an outer surface engaged flush against an inside surface of said reflector body.

9. The fixture according to claim 6, wherein said insert comprises a stiff plate.

10. The fixture according to claim 6, wherein said insert comprises a film.

11. The fixture according to claim 1, wherein said reflecting faces are formed on an insert engaged flush against an inside surface of said body, said insert comprising a stiff plate attached to said body by adhesive.

12. The fixture according to claim 6, wherein a lower edge of said insert substantially coincides with said lower edge of said body.

13. The fixture according to claim 6, wherein a lower edge of said insert extends downwardly past said lower edge of said body.

14. The fixture according to claim 1, wherein said reflecting faces are of one-piece integral construction with said body.

15. The fixture according to claim 8, wherein said insert extends circumferentially for about one hundred twenty degrees.

16. The fixture according to claim 1 wherein said reflecting faces are generally vertical, and said step defining faces are generally horizontal.

17. A wallwash insert mountable in a reflector body of a recessed, ceiling-mount wallwash light fixture for reflecting light toward an adjacent vertical wall, said insert being curved and including outer and inner surfaces, said inner surface forming a plurality of vertically adjacent reflecting faces oriented at different angles with respect to vertical, said upper edge being of smaller radius than said lower edge, said wallwash insert being vertically stepped in that each reflecting face is separated from a vertically adjacent reflecting face by a circumferentially extending non-reflecting step-defining face which interconnects a top edge of a reflecting face with a bottom edge of another reflecting face disposed thereabove.

18. The insert according to claim 17, wherein said reflecting faces located adjacent said lower edge of said insert have smaller heights than said reflect faces located adjacent said upper edge of said insert.

19. The insert according to claim 17, wherein said insert extends for an angle of about one hundred twenty degrees.

20. The fixture according to claim 17 wherein said reflecting faces are generally vertical, and said step defining faces are generally horizontal.

*21. A recessed, ceiling-mount wallwash light fixture for use with a lamp, comprising a reflector body including an internal reflector surface; said reflector body having a lower edge; said reflector surface including a wallwash segment extending around less than the entire inside perimeter of said reflector surface from one upright side edge of said wallwash segment to another upright side edge thereof, said wallwash segment forming a plurality of vertically adjacent reflecting faces oriented at respective inclinations with respect to vertical for reflecting light below an opposite portion of said edge, said wallwash segment being vertically stepped in that each reflecting face is separated from a vertically adjacent reflecting face by a non-reflecting step-defining face which extends from said one upright side edge to said other upright side edge and interconnects a top edge of a reflecting face with a bottom edge of another reflecting face disposed thereabove.*

*22. A wallwash insert mountable in a reflector body of a recessed, ceiling-mount wallwash light fixture for reflecting*

*light toward an adjacent vertical wall, said insert including a top edge and a bottom edge interconnected by upright side edges, said insert being curved from said top edge to said bottom edge and including outer and inner surfaces, said inner surface forming a plurality of vertically adjacent reflecting faces oriented at different angles with respect to vertical, said wallwash insert being vertically stepped in that each reflecting face is separated from a vertically adjacent reflecting face by a non-reflecting step-defining face which interconnects a top edge of a reflecting face with a bottom edge of another reflecting face disposed thereabove, each of said step-defining faces extending from one of said upright side edges of said insert to another of said opposite upright side edges.*

* * * * *